F. L. OGDEN.
FARM TRACTOR.
APPLICATION FILED FEB. 15, 1915.

1,169,732.

Patented Jan. 25, 1916.

WITNESSES:
Emma Heckel.
Clarence Walkup.

INVENTOR:
Frank L. Ogden
BY Eugene Ayres,
ATTORNEY.

UNITED STATES PATENT OFFICE.

FRANK L. OGDEN, OF GOWER, MISSOURI.

FARM-TRACTOR.

1,169,732.   Specification of Letters Patent.   Patented Jan. 25, 1916.

Application filed February 15, 1915. Serial No. 8,201.

*To all whom it may concern:*

Be it known that I, FRANK L. OGDEN, a citizen of the United States of America, residing at Gower, in the county of Clinton and State of Missouri, have invented certain new and useful Improvements in Farm-Tractors, of which the following is a specification.

Figure 1:
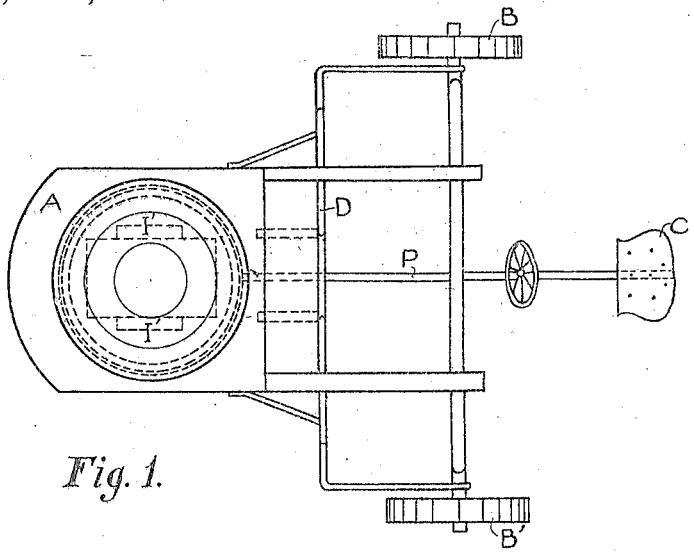
Figure 2:
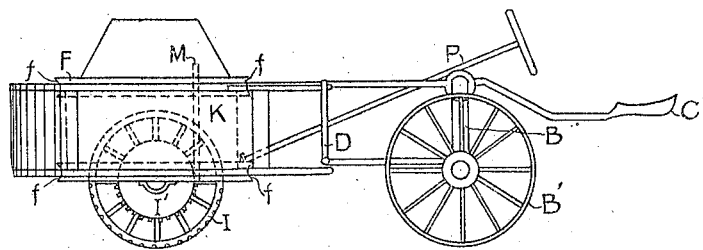
Figure 3:
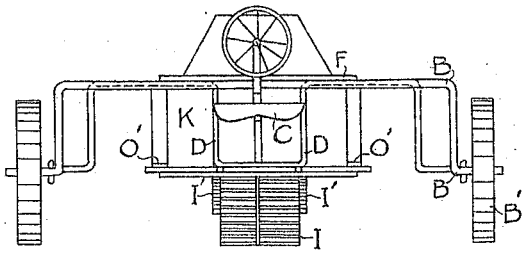
Figure 4:
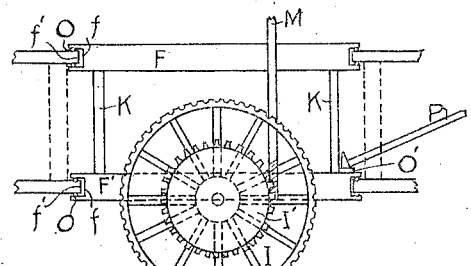

My purpose in this invention is to provide a device that will serve as a substitute for horses on a farm in cultivating and gathering crops, for road dragging, and wherever power for pulling or pushing is required. I accomplish this object by the mechanism illustrated in the accompanying drawings, in which, Figure 1 is a plan view of the tractor; Fig. 2 is a side view thereof; Fig. 3 is a rear view of the same, and Fig. 4 is a vertical sectional view through the housing or frame of the tractor and the drive wheel thereof.

Similar letters refer to corresponding parts throughout the several views and the specifications hereinafter set forth in which the letter A indicates the body or frame of the tractor, B the axle and B' B' the wheels thereon.

C is the driver's or operator's seat on the tractor.

D is a detachable arch for use when the machine is in operation as a cultivator, or other double row tool.

F is a top plate adapted to seat a motor; said motor can be attached to the drive wheel I in any suitable manner.

F' is a bottom plate vertically below top plate F and rigidly connected therewith by means of a drum K. Each of said plates is provided with a grooved periphery *f* adapted to travel on a tongue *f'* on the circular openings in the frame, A, and is also provided with a plurality of ball-bearings O O—to operate between the plates and frame, and a plurality of cogs O' O'—are set on the top of plate F' in which a steering gear of any suitable type operates. A large slot central in revoluble grooved plate F'' is provided with a revoluble cross-bar or axle, *t*, the ends of which are carried in said plate on opposite sides of said slot. Said drive wheel I and attached gears I' I' on the opposite sides of the drive wheel are rigid, each with the other, and also on said axle *t*. Said drive wheel, gears and axle all revolve together when the tractor is in operation.

Instead of using only one driving and gear wheel and one shaft I desire to reserve the right to substitute duplicates for those hereinbefore described.

To operate the tractor the driver having started the motor by means of a lever throws the machine in gear. This puts the driving wheel in motion and the plow, mower, binder, wagon or whatever can be drawn by horses or other power is pulled or pushed, as may be desired.

By the attachment of arch D to the machine the machine is especially adapted to serve as a cultivator.

To steer the tractor it is only necessary to steer the drive wheel to right or left: This not only turns the wheel which steers the machine but also the motive power and transmission gear, thereby always keeping the motor and transmission gears in the same relative position to that of said drive wheel.

What I claim and desire to secure by Letters Patent, is:

1. A farm tractor comprising a main frame a lower and an upper plate connected rigidly together by means of a drum and grooved to receive main frame ball bearings in the grooves to facilitate the movements between the plates and the frame, the lower plate provided with a plurality of cogs on its top to receive any suitable steering device, a power unit on the upper plate, a drive wheel connected with the lower plate so that when the lower plate revolves the drive wheel, upper plate and power unit on the upper plate will always remain in the same relative position to each other the power unit on the upper plate transmitting its power to the drive wheel in the lower plate by means of a gear drive.

2. A farm tractor having a front unit comprising a lower and an upper circular plate, a drum connecting the same rigidly together, said plates having grooved peripheries to receive the main frame, ball bearings in said grooves, the lower plate provided with a plurality of cogs on its top to receive a steering device, a power unit on the upper plate, a drive wheel connected with the lower plate so that when the lower plate revolves the drive wheel, upper plate and power unit on the upper plate will always remain in the same relative position to each other, the power unit on the upper plate transmitting power to the drive wheel in the lower plate by means of a gear drive, a gear drive, a detachable rear arch, the axles thereof and the wheels thereon.

In testimony whereof I affix my signature in presence of two witnesses.

FRANK L. OGDEN.

Witnesses:
CLARENCE WALKUP,
A. H. MITCHELL.